United States Patent
Brighton (12)

(10) Patent No.: US 6,279,853 B1
(45) Date of Patent: Aug. 28, 2001

(54) AIRCRAFT UNDERCARRIAGE LOCK MECHANISM

(75) Inventor: Trevor A Brighton, Bristol (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/486,435

(22) PCT Filed: Feb. 2, 2000

(86) PCT No.: PCT/GB00/00292

§ 371 Date: Feb. 28, 2000

§ 102(e) Date: Feb. 28, 2000

(87) PCT Pub. No.: WO00/48903

PCT Pub. Date: Aug. 24, 2000

(30) Foreign Application Priority Data

Feb. 16, 1999 (GB) ................................................. 9903353

(51) Int. Cl.[7] .................................................. B64C 25/10
(52) U.S. Cl. ................................ 244/102 SL; 244/102 R
(58) Field of Search ........................... 244/100 R, 102 R, 244/102 A, 102 SL

(56) References Cited

U.S. PATENT DOCUMENTS

| 2,567,114 | 9/1951 | Linn | 244/102 R |
|---|---|---|---|
| 2,661,171 | 12/1953 | Allen | 244/102 R |
| 2,720,369 | 10/1955 | Detzer | 244/102 R |
| 4,568,045 | 2/1986 | Mayer | 244/102 R |
| 5,022,609 | * 6/1991 | Cranston | 244/102 SL |
| 5,040,747 | 8/1991 | Kane et al. | 244/102 R |
| 5,100,083 | * 3/1992 | Large et al. | 244/102 R |
| 5,263,664 | * 11/1993 | Derrien et al. | 244/102 R |
| 5,269,481 | * 12/1993 | Derrien | 244/102 SL |

FOREIGN PATENT DOCUMENTS

| 0 265 197 | 4/1988 | (EP) . |
|---|---|---|
| 2 161 202 | 1/1986 | (GB) . |

\* cited by examiner

*Primary Examiner*—J. Woodrow Eldred
(74) *Attorney, Agent, or Firm*—Nixon & Vanderhye P.C.

(57) ABSTRACT

An aircraft undercarriage mechanism 20 comprising a first lock member 22 mounted on the undercarriage 14, the first lock member being engageable with a second lock member 24 mounted on a wing 10 of the aircraft. The first lock member 22 comprises a pivotable arm 26 which carries a roller 36. The roller 36 is rotatable and slidable on the arm 26 and is engageable with a catch 48 on the second lock member 24. The provision of the pivotable arm 26 and slidable roller 36 permits relative movement between the lock members 22, 24 when the undercarriage 14 is retracted with the lock members interengaged to minimise transmission of forces created by wing deflection from one lock member to the other.

9 Claims, 5 Drawing Sheets

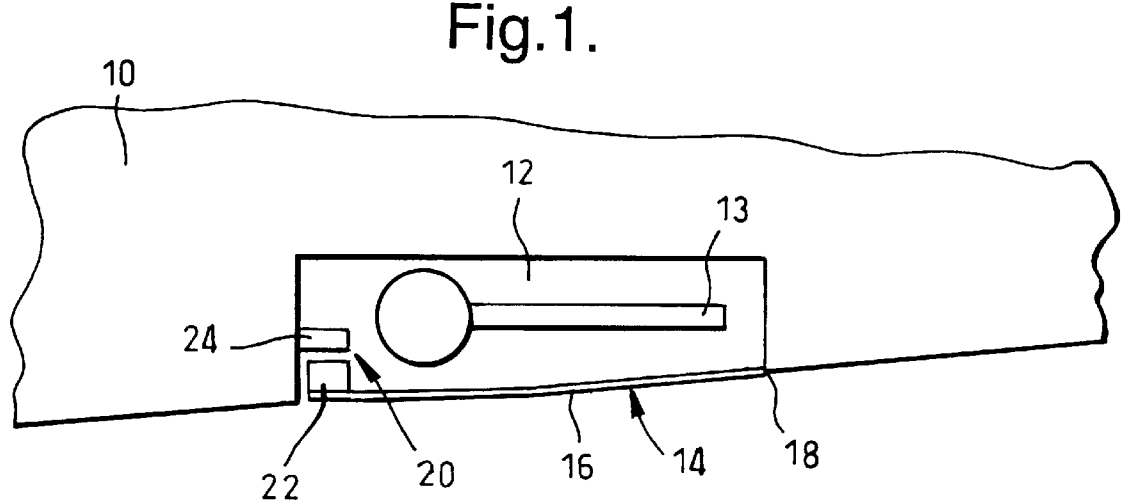
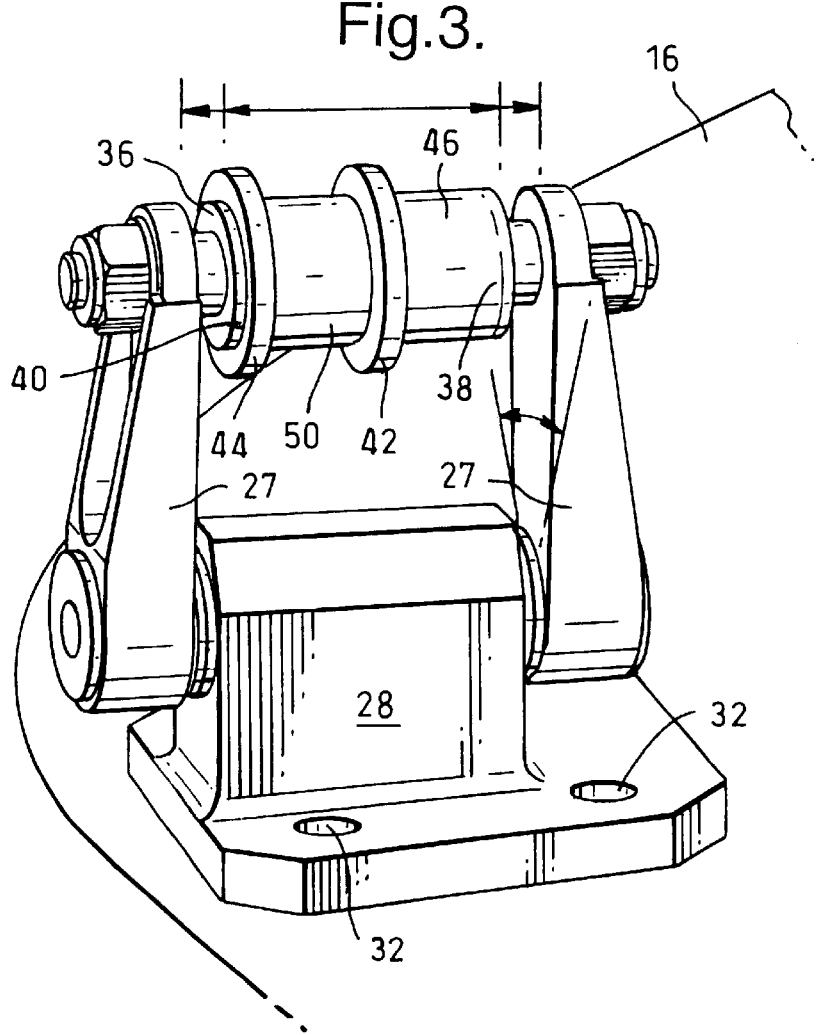

AIRCRAFT UNDERCARRIAGE LOCK MECHANISM

BACKGROUND TO THE INVENTION

The invention relates to an aircraft undercarriage mechanism. The invention is to be applied primarily to an aircraft wing landing gear door which must remain safely closed when the landing gear wheels are retained in a wheel bay during flight.

Typically, an undercarriage door is held closed by a locking mechanism comprising a catch and a member engageable with the catch, one of which member and catch is arranged on the undercarriage door and the other of which is arranged on part of the wing. Aircraft wings deflect during flight as various forces acting on the wings vary in magnitude. Such deflection can cause relative movement to occur between the door and the wing which, in turn, transmits force to the locking mechanism which can be a problem and an object of the invention is to provide a door locking mechanism which minimises that problem.

SUMMARY OF THE INVENTION

According to an aspect of the present invention there is provided an aircraft undercarriage mechanism comprising a first lock member mounted on the undercarriage, the first lock member being engageable with a second lock member mounted on a support part of the aircraft, one of said lock members including means which permits relative movement between the lock members when the undercarriage is retracted with the lock members interengaged to minimise transmission of forces created by wing deflection from one lock member to the other.

The said means may permit relative movement in more than one direction. Where wing deflection is, say, of a combined bending and torsional kind, the movement of the interengaged lock member will preferably accommodate both kinds of deflection.

Preferably, the said means comprises an element movably mounted on the one lock member. In such a case, the element may be slidable and/or rotatable on the one lock member. In that way, the other lock member may remain interengaged with the element while the one lock member having the element thereon is able to move relative to the element. The element may conveniently take the form of a roller.

Preferably, alignment means is provided for receiving and positioning the element relative to the other lock member during closing of the door. That is allows the element to be moved into an optimum position before the lock members interengage. In such a case, the alignment means may have a cam surface which is arranged to position the element. The alignment means may limit the frictional loads which would, in its absence, be transmitted to the other lock member. The alignment means may comprise a fork which receives and positions the element. The alignment means is preferably arranged to hold the element in its aligned position. The element may be received in a recess defined by part of the alignment means.

In a preferred embodiment, the one lock member is in the form of an arm which may be pivotally connected to its mounting at one of its ends. Where a said element is provided, the element may be slidably mounted on an opposite end of the arm. The first lock member may be mounted on a door or leg of the undercarriage.

Preferably, said one lock member is mounted on the undercarriage.

According to a second aspect of the invention there is provided an aircraft undercarriage including a mechanism according to the first said aspect of the invention or any of the consistory clauses relating thereto.

According to another aspect of the invention there is provided an aircraft having an undercarriage mechanism according to the first said aspect of the invention or any of the consistory clauses relating thereto.

BRIEF DESCRIPTION OF THE DRAWINGS

An aircraft undercarriage door locking mechanism in accordance with the present invention will now be described by way of example and with reference to the accompanying drawings, in which:

FIG. 1 is a diagrammatic cross-section taken chord-wise through an aircraft wing showing a known type of undercarriage door in a closed position, FIG. 3 illustrates the said first lock member mounted on an undercarriage door.

DESCRIPTON OF THE PREFERRED EMBODIMENT

Figure 2:
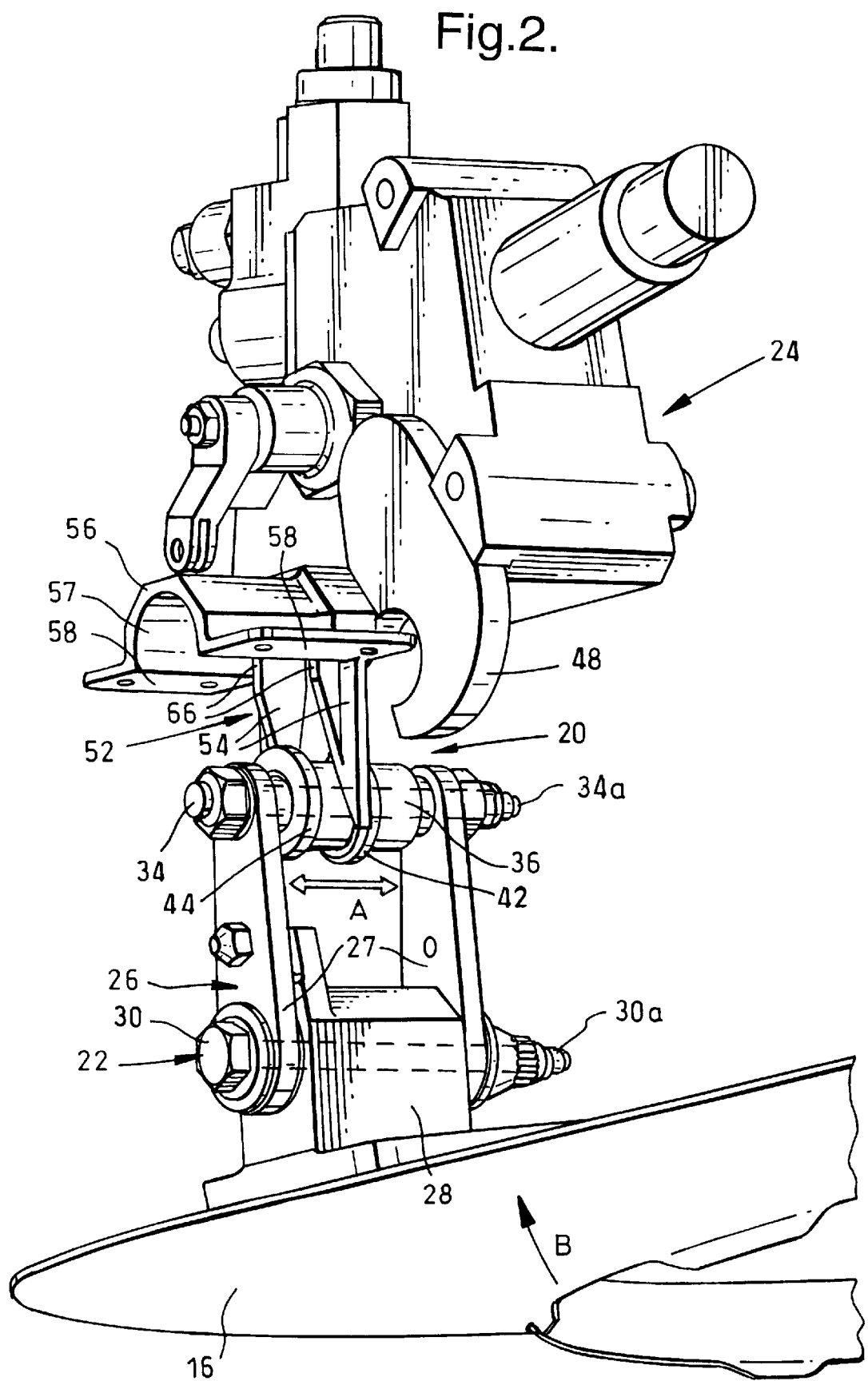
FIG. 2 is a perspective view of the aircraft undercarriage mechanism in accordance with the invention showing first and second locking members immediately prior to interengagement.
Figure 4:
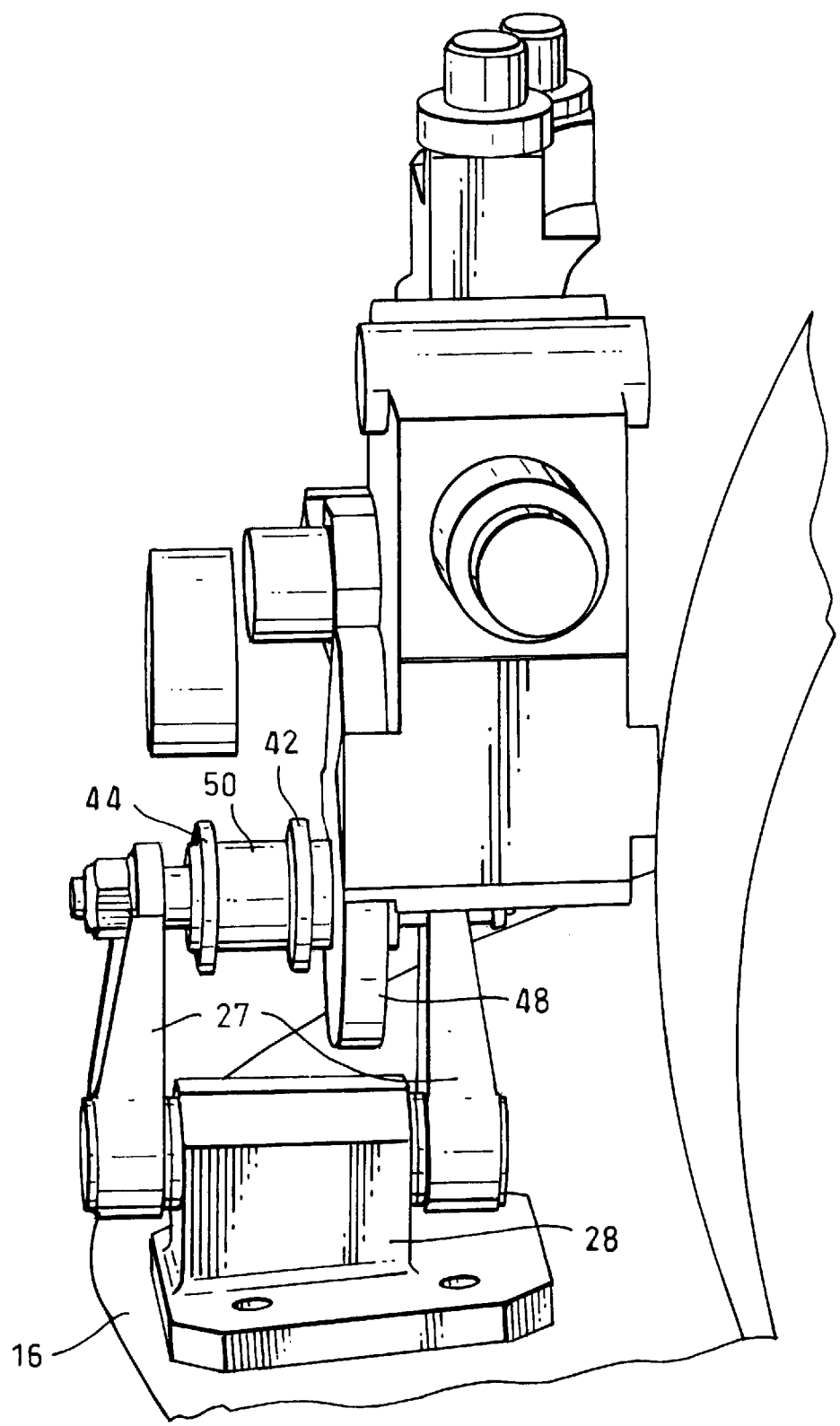
FIG. 4 is a perspective view of the locking mechanism in accordance with the invention showing the lock members interengaged but with an alignment fork omitted for clarity.

Referring to FIG. 1, an aircraft wing 10 is constructed to define an undercarriage wheel bay 12 in which a leg 13 of an undercarriage 14 (shown in broken lines) is stowed during flight. Once the undercarriage leg 13 is in its stowed position, the wheel bay 12 is closed by means of a door 16 of the undercarriage which is attached to the wing 10 by a hinge 18. The door 16 may be closed by associated hydraulics or may be moved into its closed position by the movement of the undercarriage 14 into its stowed position. Once the door 16 has reached its closed position, it is held closed by an undercarriage mechanism 20. The mechanism 20 comprises a first lock member 22 on the door 16 and a second lock member 24 on the wing 10. The lock members 22, 24 interengage to hold the door 16 closed. When the undercarriage 14 is to be lowered, the lock members 22, 24 are disengaged. Deflection of the wing 10, e.g. bending and/or twisting, causes the door 16 to move relative to the wing 10 which, in turn, transmits load to the mechanism 20. Therefore, the mechanism 20 has to be made sufficiently robust in order to tolerate such extra forces and, from the point of view of weight, that is not desirable.

Looking at FIG. 2, the first lock member 22 in accordance with the invention is in the form of an arm 26 connected to a base 28 by means of a pivot bolt 30 which passes through side sections 27 of the arm 26. The base 28 is mounted on the undercarriage door 16 by fasteners (not shown) which locate in apertures 32 in the base 28 (see FIG. 3). A further bolt 34 is passed through the free ends of the side sections 27 and supports a hollow roller 36 which is rotatable on the further bolt 34. The length of the roller 36 is less than the distance between the two spaced apart side sections 27 to allow the roller 36 to slide axially on the further bolt 34, that is in the directions of arrows A. The two bolts 30, 34 are hollow and have radial outlets through which grease (supplied to nipples 30a, 34a on the bolts) can be distributed.

Looking at FIG. 3, the roller 36 has first and second ends 38, 40 and has thereon first and second spaced apart fixed collars 42, 44. A section 46 between the first end 38 and the first collar 42 is engageable with a catch 48 on the second lock member 24 and a space 50 between the first and second collars 42, 44 is received by an alignment fork 52 as the door 16 moves towards its closed position in the direction of arrow B in FIG. 2.

Figure 6:
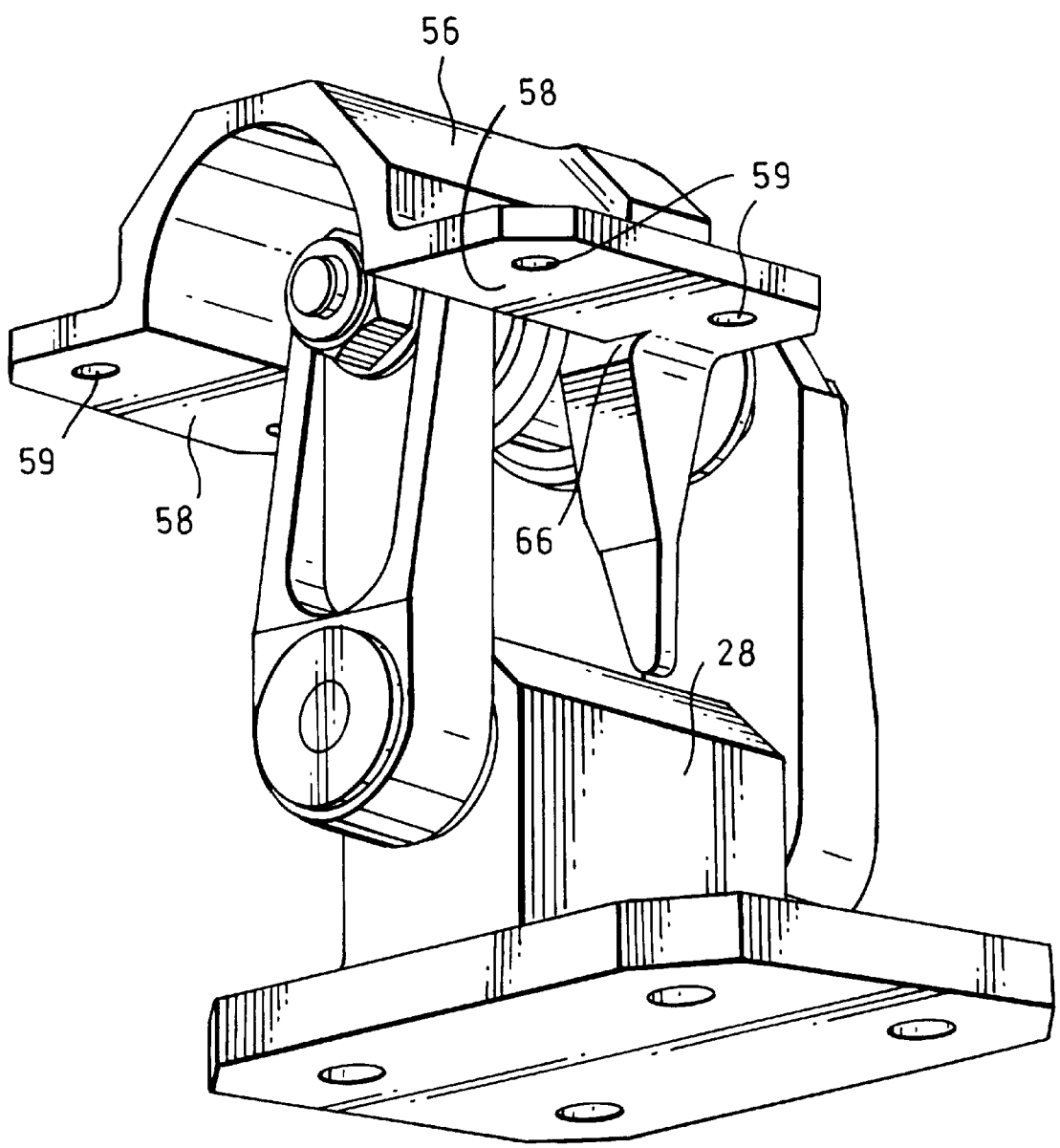
FIG. 6 is similar to FIG. 5 and viewed from an opposite side.

The fork 52 is fixed to the wing 10 adjacent the second lock member 24. The fork 52 is a single component having arms 54 which are joined at their upper ends, as viewed in FIG. 2, by mounting 56 which defines a semi-cylindrical recess 57. The mounting 56 has side flanges 58 by which it can be attached to the wing 10 using suitable fasteners which locate in apertures 59 in the flanges 58 shown in FIG. 6.

Figure 5:
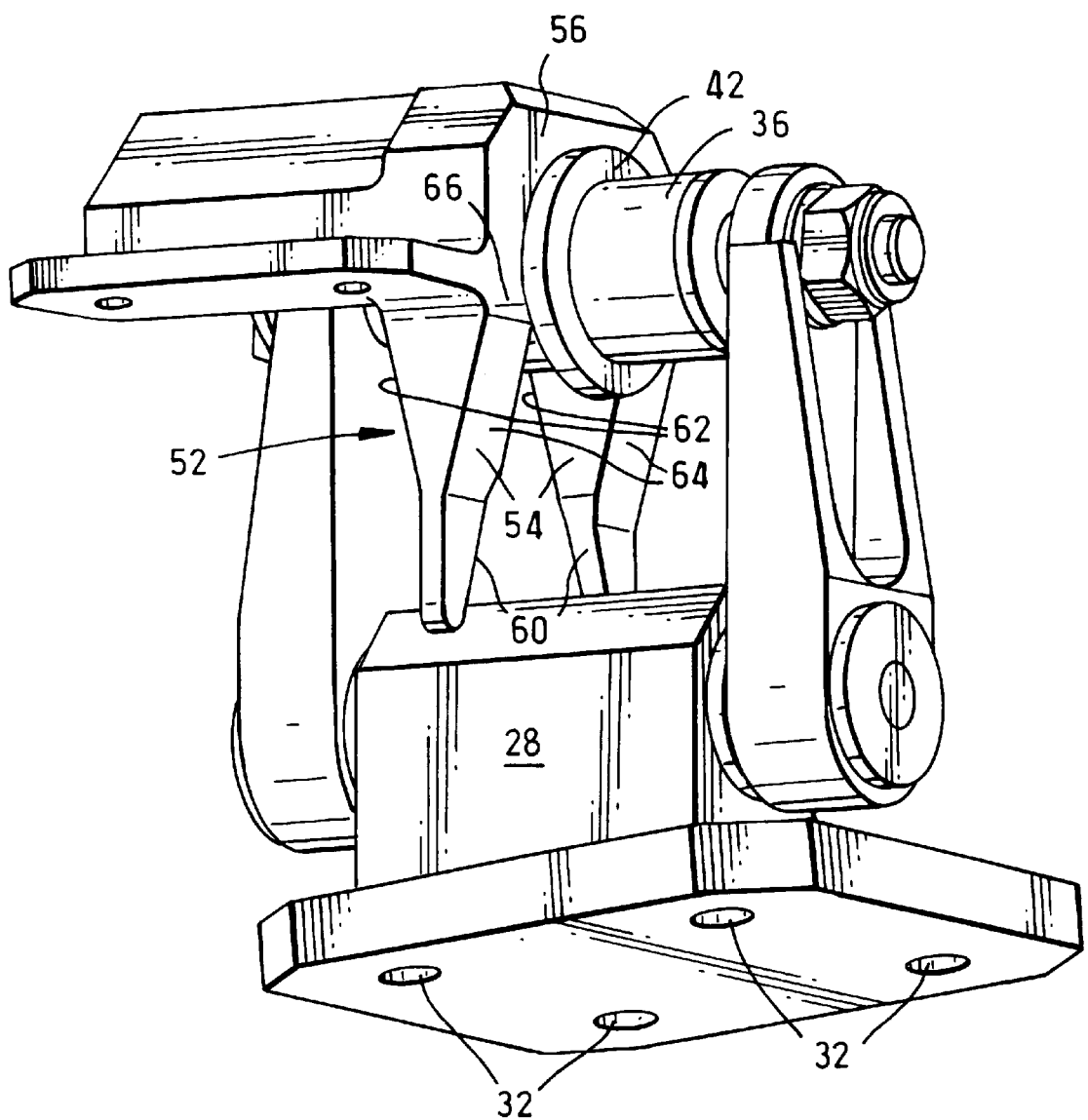
FIG. 5 shows the first lock member engaged with an alignment fork and viewed from one side.

As shown in FIG. 5, the arms 54 have respective inside faces 60 which diverge in a direction away from the mounting 56. Each of the arms 54 also has two side faces 62, 64 which converge in a direction away from the mounting. The inside faces 60 of the fork 52 serve to capture the roller 36 by entering the space 50 between the collars 42, 44 as shown in FIG. 2 as the door 16 is moved towards its closed position.

The side faces 62 serve to position the roller 36 axially on the further bolt 34. If the roller 36 is positioned too far to the left as viewed in FIG. 2, the side faces 62 will act as cams on the collar 42 to urge the roller to the right. If the roller 36 is positioned too far to the right as viewed in FIG. 2, the side faces 64 will act as cams on the collar 44 to urge the roller to the left. In that way, the fork 52 correctly aligns the section 46 of the roller 36 with the catch 48.

Each of the arms 54 has further side faces 66 which are parallel and extend between the upper ends of the side faces 64 and the interior of the recess 57. The side faces 66 of each arm 54 are spaced apart by a distance which enables the side faces 66 to fit between the two collars 42, 44 with only slight working clearance.

As illustrated in FIG. 2 and when the undercarriage mechanism 20 is not engaged, the arm 26 projects from the door 16 in anticipation of engagement between the roller 36 and the catch 48. A suitable stop arrangement (not shown) is provided on the base 28 to limit the amount of pivotal movement of the arm 26 about the pivot bolt 30. In that way, the arm 26 will be unable to pivot into a position where the roller 36 cannot be located by the fork 52. As the door 16 is almost closed the fork 52 receives the roller 36 and aligns the section 46 with the catch 48, the roller entering the recess 57 with the side surfaces 66 of the arms 54 between the collars 42, 44 to hold the roller 36 in the aligned position. A clearance c at the top of the recess 57 prevents the collar 44 from contacting the top of the recess 57. The catch 48 finally engages the section 46 to hold the door 16 closed i.e. the vertical stop is the catch 48. The catch 48 moves to engage the roller 36 in known manner.

Once the aircraft is airborne with the door 16 closed, the wing 10 will deflect as a result of forces acting thereon typically resulting in bending and twisting of the wing 10. The pivotal mounting of the arm 26 enables the wing 10 and the door 16 to move relative to each other as a result of twisting movement of the wing 10. Such relative movement causes the side sections 27 to pivot on the bolt 30 and relative to the roller 36. In that way, twisting movement of the wing 10 does not create any significant extra loading on the catch 48. By slidably mounting the roller 36 on the further bolt 34, movement of the door 16 relative to the wing 10 resulting from bending of the wing, will enable the further bolt 34 to slide axially within the roller 36 again without creating any significant extra loading on the catch 48. In that way any frictional loads caused by sliding motion of roller 36 on bolt 34 and pivoting of side sections 27 on bolt 30, are transmitted through the form 52, limiting the side loading applied to the catch 48.

It will be appreciated that combined twisting and bending movement of the wing 10 can be accommodated by the undercarriage mechanism 20 of the invention.

Although the invention is described as being applied to an aircraft wing undercarriage door it could also be used to secure the aircraft undercarriage leg 13. In such a case the first lock member 22 is carried by the leg 13.

What is claimed is:

1. An aircraft undercarriage mechanism comprising a first lock member for mounting on the undercarriage, said first lock member being engageable with a second lock member for mounting on a support part of the aircraft, one of said lock members including means which permits relative movement in more than one direction between said lock members when the undercarriage is retracted with said lock members interengaged to minimise transmission of forces created by wing deflection from one lock member to the other.

2. An aircraft undercarriage mechanism according to claim 1 in which the said means to permit relative movement comprises an element movably mounted on said one lock member.

3. An aircraft undercarriage mechanism according to claim 2 in which said element is a roller.

4. An aircraft undercarriage mechanism according to claim 2 in which alignment means is provided for receiving and positioning said element relative to said other lock member during closing of the door.

5. An aircraft undercarriage mechanism according to claim 4 in which said alignment means has a cam surface which is arranged to position said element.

6. An aircraft undercarriage mechanism according to claim 1 in which said first lock member is, in use, mounted on a door of the undercarriage and engages said second lock member when said door is closed.

7. An aircraft undercarriage mechanism according to claim 1 in which said first lock member is, in use, mounted on a leg of the undercarriage and engages said second lock member when the undercarriage leg is retracted.

8. An aircraft undercarriage mechanism according to claim 1 in which said one lock member is mounted on the undercarriage.

9. An aircraft undercarriage mechanism according to claim 1 in which the said support part of the aircraft is part of a wing of the aircraft.

* * * * *